US012160694B2

(12) United States Patent
Hoe et al.

(10) Patent No.: US 12,160,694 B2
(45) Date of Patent: Dec. 3, 2024

(54) METHOD AND APPARATUS FOR LOCAL SENSING

(71) Applicant: Elemental Machines, Inc., Salem, NH (US)

(72) Inventors: Liang Hoe, Fremont, CA (US); Sridhar Iyengar, Salem, NH (US); Brett Byer, Cambridge, MA (US); Katherine Murphy, Somerville, MA (US)

(73) Assignee: Elemental Machines, Inc., Cambridge, MA (US)

( * ) Notice: Subject to any disclaimer, the term of this patent is extended or adjusted under 35 U.S.C. 154(b) by 744 days.

(21) Appl. No.: 17/283,799

(22) PCT Filed: Oct. 1, 2019

(86) PCT No.: PCT/US2019/054020
§ 371 (c)(1),
(2) Date: Apr. 8, 2021

(87) PCT Pub. No.: WO2020/072463
PCT Pub. Date: Apr. 9, 2020

(65) Prior Publication Data
US 2021/0345019 A1 Nov. 4, 2021

Related U.S. Application Data

(60) Provisional application No. 62/739,419, filed on Oct. 1, 2018.

(51) Int. Cl.
*H04Q 9/00* (2006.01)
*G01D 21/02* (2006.01)

(52) U.S. Cl.
CPC ............. *H04Q 9/00* (2013.01); *G01D 21/02* (2013.01); *H04Q 2209/40* (2013.01)

(58) Field of Classification Search
CPC ......... G01N 29/022; G01N 2291/0226; G01N 33/2888; G01N 33/30; G01N 33/004;
(Continued)

(56) References Cited

U.S. PATENT DOCUMENTS 5,663,545 A * 9/1997 Marquiss ............... B01L 3/5453
235/375
6,023,961 A * 2/2000 Discenzo ............... F16C 41/008
73/61.79

(Continued)

FOREIGN PATENT DOCUMENTS

CN 204228683 U * 3/2015
CN 108171301 A 6/2018
(Continued)

OTHER PUBLICATIONS

Joseph M. Azzarelli et al., "Wireless gas detection with a smartphone via rf communication", Proceedings of the National Academy of Sciences, vol. 111, No. 51, Dec. 23, 2014. (Year: 2014).*
(Continued)

*Primary Examiner* — Tran M. Tran
(74) *Attorney, Agent, or Firm* — Anderson Patent Law Firm LLC

(57) ABSTRACT

A sensing system is provided. The system comprises a microprocessor (or computing device) with a memory, means of transmitting information wirelessly, an antenna, a power supply, and a sensor configured to measure at least one environmental parameter.

15 Claims, 1 Drawing Sheet

(58) Field of Classification Search
CPC ... G01N 2291/106; G01N 2291/02818; G01N 2291/0256; G01N 33/0037; G01N 33/0039; G01N 33/0044; G01N 33/0062; G01N 27/4141; G01N 27/4045

See application file for complete search history.

(56) References Cited

U.S. PATENT DOCUMENTS

| | | | | |
|---|---|---|---|---|
| 6,575,364 | B1* | 6/2003 | Feygin | G06K 19/06196 235/493 |
| 6,796,187 | B2* | 9/2004 | Srinivasan | G01M 5/0033 73/784 |
| 7,034,660 | B2* | 4/2006 | Watters | G01M 5/0008 205/777 |
| 7,219,536 | B2* | 5/2007 | Liu | G01N 33/2888 73/54.24 |
| 7,493,799 | B1* | 2/2009 | Discenzo | F16C 19/52 184/6 |
| 7,690,246 | B1* | 4/2010 | Discenzo | F16C 41/008 184/6 |
| 7,698,962 | B2* | 4/2010 | LeFebvre | B61L 15/0081 177/136 |
| 7,986,236 | B2* | 7/2011 | Erikson | G06K 19/07749 340/572.8 |
| 8,237,561 | B2* | 8/2012 | Beigel | H01Q 1/2225 340/10.33 |
| 8,465,699 | B2* | 6/2013 | Fehr | G01N 21/64 356/73.1 |
| 8,497,134 | B2* | 7/2013 | Reed | G01N 21/80 422/50 |
| 8,641,617 | B2* | 2/2014 | Natarajan | G09G 5/02 374/166 |
| 8,701,469 | B2* | 4/2014 | Ober | G01N 33/0031 73/61.41 |
| 8,744,578 | B2* | 6/2014 | Ellingson | A61N 1/3704 607/30 |
| 8,947,224 | B2 | 2/2015 | Jensen et al. | |
| 9,194,788 | B2* | 11/2015 | Kato | G01N 33/208 |
| 9,322,784 | B2* | 4/2016 | Grassl | G01N 21/6452 |
| 9,739,762 | B2* | 8/2017 | Schmidlin | G01N 33/0063 |
| 9,824,246 | B2* | 11/2017 | Lee | G06K 7/10009 |
| 9,872,641 | B2* | 1/2018 | Sloan | A61B 5/14532 |
| 9,882,610 | B1* | 1/2018 | Baker | H04W 4/80 |
| 9,933,265 | B2* | 4/2018 | Fernandez | H04W 4/029 |
| 9,942,629 | B2* | 4/2018 | McCleland | B81B 7/02 |
| 9,991,596 | B2* | 6/2018 | Rokhsaz | H01Q 1/2291 |
| 10,024,831 | B2* | 7/2018 | Ruhl | G01N 33/004 |
| 10,126,288 | B2* | 11/2018 | Radjy | G01N 33/383 |
| 10,240,965 | B2* | 3/2019 | Kumar | G01F 23/268 |
| 10,499,503 | B2* | 12/2019 | Seo | G02B 27/017 |
| 10,585,092 | B2* | 3/2020 | Lee | B01L 3/502 |
| 10,816,415 | B2* | 10/2020 | Choi | B60C 23/064 |
| 10,899,154 | B2* | 1/2021 | Krumbholz | G01L 1/2287 |
| 10,953,157 | B2* | 3/2021 | Klemm | G01F 23/268 |
| 10,990,235 | B2* | 4/2021 | Gospel | G06F 3/04146 |
| 11,018,900 | B2* | 5/2021 | Iyengar | F25D 29/008 |
| 11,137,368 | B2* | 10/2021 | Stowell | G01N 27/4145 |
| 11,665,024 | B2* | 5/2023 | Iyengar | H04L 12/6418 370/352 |
| 11,763,122 | B2* | 9/2023 | Saenz | G06K 19/0723 235/385 |
| 11,940,455 | B2* | 3/2024 | Suter | G16H 10/40 |
| 2002/0188259 | A1* | 12/2002 | Hickle | B65D 23/14 604/189 |
| 2006/0006137 | A1* | 1/2006 | Niblock | G01N 17/02 216/41 |
| 2008/0131922 | A1* | 6/2008 | Muraki | C12M 41/46 435/29 |
| 2008/0240245 | A1* | 10/2008 | Lee | H04N 19/147 375/E7.125 |
| 2009/0012633 | A1* | 1/2009 | Liu | G06F 1/206 700/90 |
| 2009/0273470 | A1* | 11/2009 | Sinkevicius | G08B 25/10 340/539.26 |
| 2010/0105035 | A1* | 4/2010 | Hashsham | G01N 21/645 435/6.19 |
| 2010/0217099 | A1 | 8/2010 | Leboeuf et al. | |
| 2011/0119100 | A1* | 5/2011 | Ruhl | G06F 16/958 705/7.11 |
| 2012/0064564 | A1* | 3/2012 | Grassl | G01N 33/5005 250/459.1 |
| 2014/0152323 | A1* | 6/2014 | Kumar | G01F 23/00 324/658 |
| 2017/0212094 | A1* | 7/2017 | Radjy | G01N 33/383 |
| 2018/0062877 | A1 | 3/2018 | Iyengar | |
| 2018/0365549 | A1* | 12/2018 | Nikitin | G06K 7/10158 |
| 2019/0204293 | A1* | 7/2019 | Donohue | G01N 27/021 |
| 2019/0362303 | A1* | 11/2019 | Lawler, Jr. | G09F 3/0291 |
| 2020/0131459 | A1* | 4/2020 | Baum | B01L 3/50853 |
| 2021/0209433 | A1* | 7/2021 | Welle | G06K 19/0723 |
| 2022/0128470 | A1* | 4/2022 | Rager | B01L 9/523 |
| 2023/0240284 | A1* | 8/2023 | Johnston | B01L 3/545 435/307.1 |
| 2024/0023845 | A1* | 1/2024 | Duan | A61B 5/1468 |

FOREIGN PATENT DOCUMENTS

| | | | | |
|---|---|---|---|---|
| EP | 3 179 222 A1 | 6/2017 | | |
| GB | 2479520 A | * 10/2011 | | G08C 17/02 |

OTHER PUBLICATIONS

Peng Jiang et al., "Smart Sensing Strip Using Monolithically Integrated Flexible Flow Sensor for Noninvasively Monitoring Respiratory Flow", Sensors, Dec. 15, 2015. (Year: 2015).*

Jun Seop Lee et al., "Wireless Hydrogen Smart Sensor Based on Pt/Graphene-Immobilized Radio-Frequency Identification Tag", School of Chemical and Biological Engineering, College of Engineering, Seoul National University, Jun. 10, 2015. (Year: 2015).*

ESPACENET Machine Translation of CN 204228683 Originally Published On Mar. 25, 2015. (Year: 2015).*

Chunlei Zhang et al., "Methane Gas Density Monitoring and Predicting Based on RFID Sensor Tag and CNN Algorithm", Electronics, May 12, 2018. (Year: 2018).*

Sung Gun Kim et al., "A highly sensitive wireless nitrogen dioxide gas sensor based on an organic conductive nanocomposite paste", Journal of Materials Chemistry A, vol. 7, 2019. (Year: 2019).*

Ailyn Estevez et al., "RFID Gas Sensor for In-field Detection of Chemical Threats: Evaluation of batteryless discontinuous operation", IEEE Sensors, 2022. (Year: 2022).*

* cited by examiner

METHOD AND APPARATUS FOR LOCAL SENSING

CROSS-REFERENCE TO RELATED APPLICATIONS AND PRIORITY

This application is related and claims the benefit of US Prov. Applications entitled "Method and Apparatus for Local Sensing" which was filed on Oct. 1, 2018 and received U.S. Provisional Application Ser. No. 62/739,419;

Any external reference mentioned herein, including for example websites, articles, reference books, textbooks, granted patents, and patent applications are incorporated in their entireties herein by reference for all purposes.

BACKGROUND OF THE INVENTION

Executing a process defined by a protocol or procedure is part of virtually every modern industrialized field. For example, scientists execute experimental protocols, health care providers execute clinical protocols, factory workers execute manufacturing procedures. For a successful outcome, one must execute the steps of such protocols and processes in a reproducible and repeatable manner. However, there are challenges to doing so. Since these processes are executed in the real physical world, there are myriad variables that can introduce errors and variations to lessen the reproducibility and repeatability. These reproducibility problems are well known in industry and as a result there have been various methods developed to overcome, prevent, or address such process variations, such as the "Six Sigma" method, among others.

One of the major causes of irreproducibility is environmental variations that can affect the quality of materials and/or the rate of chemical and biological processes and reactions. Environmental variations can include quantities such as temperature, absolute humidity, relative humidity, light intensity, electromagnetic wave intensity, electromagnetic wave frequency, RF interference, air pressure, flow rate, air quality, particulate count, VOC (volatile organic compound) concentration, concentrations of different gases, such as oxygen, $CO_2$, CO, $N_2$, and others gases, pH, physical motion including vibration and rotation, magnetic and electric fields, and other measurable quantities of the natural world.

Often, processes are carried out on materials as they progress through a series of steps. Such materials can include organic tissues, cells, chemicals, DNA, RNA, molecules, atoms, elements, solids, liquids, gases, and/or solutions to name a few examples. Also, materials can include larger items such as clusters of cells, multi-cellular organisms, bacteria, viruses, fungi, plants, and animals. In all of these cases, it would be useful to have a way to capture the relevant local environmental variables before, during, and after the process has been run.

Measurement of non-local environmental variables using sensors to monitor the environment of a room where at least one step of a process is being executed, or via sensors placed in the general vicinity of where certain steps may be occurring do not provide direct visibility of local environmental conditions of the material/process space. In particular, these sensors are generally fixed in place; that is, they are attached to a building wall or ceiling or placed in a location that is only somewhat near the vicinity of where a process step may be occurring. These stationary sensors cannot measure and cannot record the specific local environments that the material experiences as it progresses through the process steps.

Improvements in the art and the ability to sense and record local environmental conditions are desired.

BRIEF SUMMARY OF THE INVENTION

In a first embodiment, the present invention provides a sensing system comprising a microprocessor (or computing device) with a memory, means of transmitting information wirelessly, an antenna, a power supply, and a sensor configured to measure at least one environmental parameter. In additional embodiments, the present invention provides method of forming a combination, a method of using the combination, and the combination itself of the sensing system associated with a material or a container the material.

DETAILED DESCRIPTION OF THE INVENTION

Figure 1:
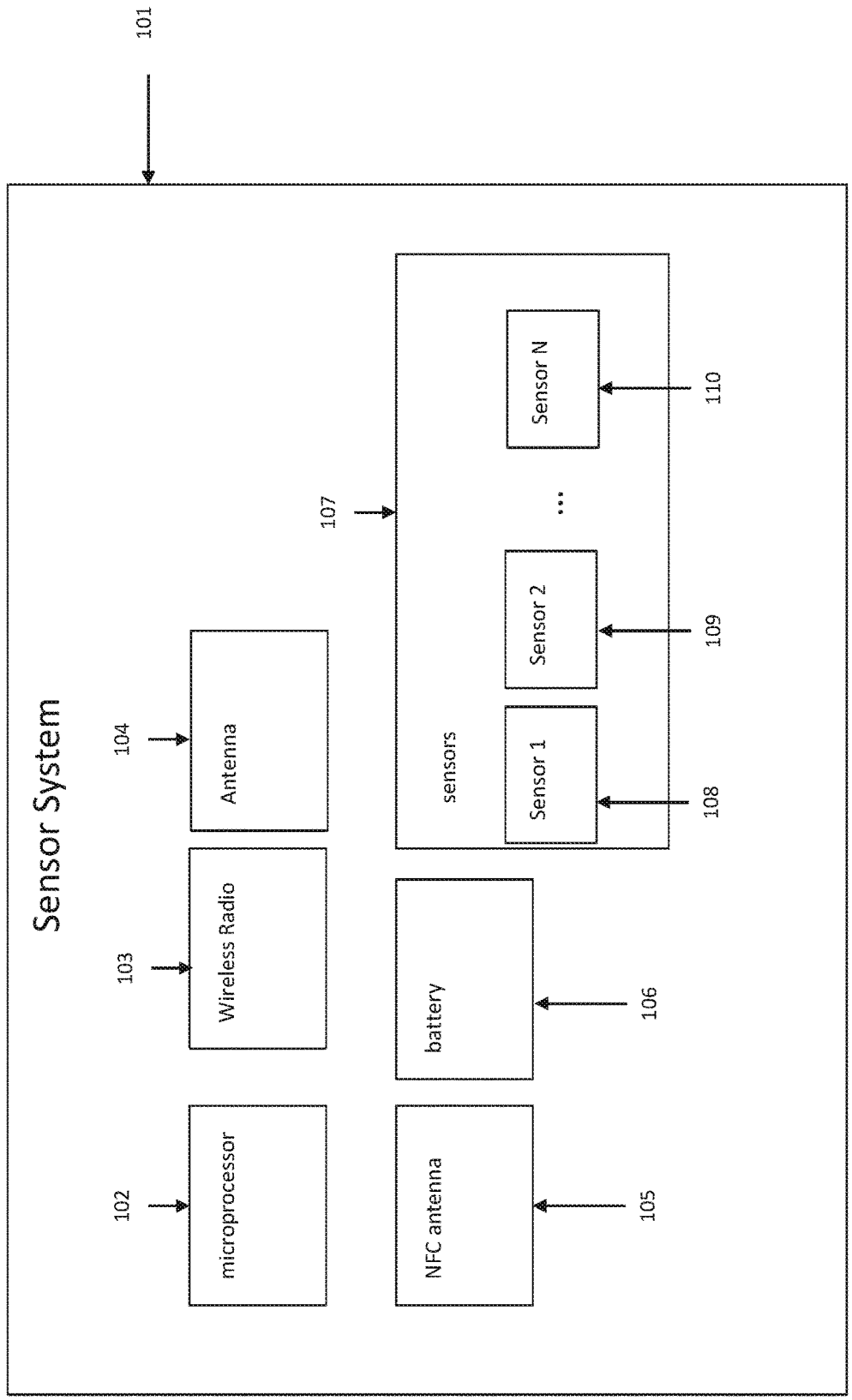
FIG. 1 shows a sensor system in accordance with the present invention.

The present invention provides solutions to the above-described problems in the art.

In particular, the present invention provides sensing systems that can be attached (preferably removably attached) to a material or an object that holds or contains the material of interest (e.g. attached to the material of interest directly or attached to an object that holds or contains the material of interest (a container, a bottle, beaker, box, plate, test tube, microplate, cage, or similar object)). The sensing systems are capable of measuring, recording, and transmitting the values representative of the local environment conditions that the material experiences. The sensing system may be single use, multiple use, disposable, and/or re-usable.

In one embodiment, the present invention provides an apparatus for measuring, storing, and transmitting the values of environmental variables associated with the local environment of a material of interest before, during, and after the course of executing a process with that material. In such embodiments, when the sensor system is associated with the material, the sensing system can provide great visibility to conditions and process conditions that the material is experiencing. For example the sensing system can be attached to a micro-well plate that is subject to high-throughput screening for determining pharmaceutical candidates that exhibit positive affinity for a target. In such embodiments, understanding the local environmental conditions of the sample or material as it passes through process (laboratory or manufacturing) equipment can provide understanding as to why, or why not, the experiment worked or provide serendipitous understandings of unexpected results, etc.

In another embodiment, the present invention provides a method for measuring, storing, and transmitting the measured values of environmental variables associated with the local environment of a material of interest before, during, and after the course of executing a process with that material.

The environmental variables include those that may affect the quality of the process and/or that may affect the result achieved upon completion of the process (e.g. quality of the resulting material produced and/or quality of analysis, etc.).

The variables can include "N" number of variables that again may affect the quality of performing the process and/or the outcome/result achieved by the process. The variable can include, among others:

Temperature
Absolute humidity and relative humidity
light intensity and wavelengths
electromagnetic wave intensity
electromagnetic wave frequency
RF interference
motion including vibration and rotation
gas concentration (such as oxygen, CO2, etc.)
air pressure
flow rate
VOC concentration (volatile organic compounds)
particulate level
measure of air quality including particulate count and VOC (volatile organic compound) concentration
concentrations of different gases, such as oxygen, CO2, CO, N2, and other gases
pH
magnetic and electric fields
capacitance
and other measurable quantities of the natural world In one embodiment the sensing system comprises:
a microprocessor (or computing device) with a memory
at least one means of transmitting information wirelessly, such as:
  a wireless radio (for example bluetooth, Zigbee, or RF)
  an NFC (Near Field Communication) chip
  RFID (Radio Frequency Identification) chip
  Wifi chip
  Cellular chip
an antenna, such as:
  a Bluetooth antenna
  an NFC antenna
  an RFID antenna
  wifi antenna
  cellular antenna
a power supply, such as one of the following:
  a battery
  a photovoltaic cell
  a thermoelectric generator such as a Peltier device
at least one sensor that is configured to measure at least one environmental parameter Optionally, the apparatus further comprises an adhesive or magnetic portion to allow for attachment of the sensor system to another object.

The sensor system can be shaped in a thin (e.g. less than 5 mm, such as less than 3 mm) planar and may be flexible so that it can take the contour of a surface it is attached to (e.g. such as a vial or beaker). To achieve flexibility, the electronic components may be mounted on a flex circuit. There are several options for a suitable power supply that can allow for flexibility. For example, a flexible planar battery may be used such as the ones from www.brightvolt.com https://www.brightvolt.com/. Alternatively, a small coin-cell battery may also be used.

The sensor system may be configured to transmit data at regular intervals, for example, once a minute, once an hour, or once a day. Alternatively, it can be configured to only transmit when interrogated, for example, by sending a signal to the sensor system requesting data to be transmitted, or by bringing an RFID ore NFC reader in proximity of the RFID or NFC antenna if it has one.

Data from the sensor system may be transmitted to a smart phone, a gateway device, wifi router, sensor control unit or cellular receiver. This data (optionally with a unique identification of the sensor system apparatus) can then subsequently be transmitted to and stored in a in a file system (e.g. such as one having optical and/or electronic storage means in a file structure and/or file hierarchy, such as a database, etc.) (e.g.g. resident in the facility on a on a computer or local server or on a remote/cloud server via the internet).

In yet an additional embodiment, the present invention provides a sensing system having a microprocessor (or computing device) in communication with a memory; means of transmitting information wirelessly; an antenna; a power supply; and a sensor configured to measure at least one environmental parameter. Non-limiting examples of means of transmitting information wirelessly include a wireless radio (for example bluetooth, Zigbee, or RF); an NFC (Near Field Communication) chip; an RFID (Radio Frequency Identification) chip; a WiFi chip; and a Cellular chip. The antenna can be selected accordingly from the group consisting of: a Bluetooth antenna; an NFC antenna; an RFID antenna; a wifi antenna; and a cellular antenna. The power supply is selected from the group consisting of: a battery; a photovoltaic cell; a thermoelectric generator such as a Peltier device. The system can further include an adhesive or magnetic portion to allow for attachment of the sensor system to another object or material. The microprocessor (or computing device) with a memory; the means of transmitting information wirelessly; the antenna; the power supply; and the sensor are electrically and/or communicatively coupled and mounted on a thin (e.g. less than 5 mm, such as less than 3 mm) flexible circuit such that the entire system is flexible and can take the contour of a surface it is attached to (e.g. such as a vial or beaker). Preferably the battery is a flexible planar battery or a small coin-cell battery.

In further preferred embodiments, the system and/or sensor is configured to transmit data: (a) at regular intervals (e.g. for example, once a minute, once an hour, or once a day; or (b) only when interrogated (e.g. for example, by sending a signal to the sensor system requesting data to be transmitted, or by bringing an RFID ore NFC reader in proximity of the RFID or NFC antenna if it has one). Preferably the data is transmitted to a smart phone, a gateway device, wifi router, sensor control unit or cellular receiver. Alternatively or subsequently the transmitted data is subsequently be transmitted to and stored on a computer, server, or cloud server. Preferably, the data is associated with the time of the reading that is a time stamp and a unique identification of the sensor system apparatus.

The present invention also provides a combination of any of the sensing systems herein described when associated with a material or a container comprising a material.

In further embodiments, the present invention provides methods for determining local conditions of environmental data of a material, wherein the method comprises the steps of: (a) associating the sensing system as described in any system paragraph above with the material (e.g. by attaching it to the material or to a surface (exterior or interior) of a container that holds the material), and (b) using the sensor to measure a value of at least one environmental parameter. In preferred embodiments, the methods further comprise the step of: (c) wirelessly transmitting the value of the environmental parameter measured in step (b) to a smart phone, a gateway device, wifi router, sensor control unit and/or cellular receiver, optionally wherein the data is associated with the time of the reading that is a time stamp and a unique identification of the sensor system apparatus. Alternatively, or in addition, the methods further comprise the step of: wirelessly transmitting the value of the environmental parameter measured in step (b) to a electronic laboratory notebook system and/or aggregated data file system as described herein (optionally wherein the at least one environmental parameter is measured before, during, or after the material progresses through a protocol/process run).

EXAMPLES OF THE INVENTION

FIG. 1 shows one embodiment of a sensor system 101 that comprises a microprocessor 102, a wireless radio 103, an antenna 104, and NFC antenna 105, a battery 106, and a set of sensors 107 comprising at least one sensor 108, and may comprise additional sensors 109 and multiple other sensors up to sensor (N) 110. In this embodiment, both an NFC antenna 105 and a second antenna 104 are present. The second antenna 104 may be used for Bluetooth communication, ZigBee communication, or RF communication. It is not necessary for both antennas to be present. Furthermore, battery 106 may be a flexible battery or a coin cell battery.

One example of measuring environmental parameters before executing a process is to measure how starting materials are stored. This can be done by attaching the sensor system to a container that holds a material of interest. In one example, the sensor system is adhered to the external surface of a container such as a bottle. In this manner, the local conditions (for example, temperature, light intensity, humidity, etc.) of how the bottle of material was stored can be measured.

In a preferred embodiment, the sensor system is attached to an interior surface of the container, preferably the interior surface of a cap of the container. This provides a relevant measure of the local environment in which the material is stored.

By measuring the local environment of a material before it is used in a process, it is possible to determine whether or not the material was stored in a proper manner so as to not be damaged or contaminated. If it is determined that material was stored in a manner such that it is or could be damaged or contaminated, then the material may be discarded before it is used in a process or protocol, thereby saving costly waste and effort.

Another example of using local environmental data is to incorporate motion information. In this embodiment, the sensor system comprises a motion sensor such as an accelerometer. By attaching the sensor system to a surface of a container, a user can determine when the container was moved based on a change in the acceleration sensor. The movement of a container can be related to and indicative of when a particular process step was executed. Therefore, motion of a container can be used to estimate the time between steps on a protocol or the duration of a step in a protocol.

Another example is to measure the local environment of multiple samples of material, for example in a multi-well plate, sometimes also known as a microwell plate or a microplate. A microplate typically has 6, 12, 24, 48, 96, 384 or 1536 sample wells. Each sample well may contain a sample. Thus, attaching a sensor system to a surface of a microplate can allow a user to track the full environmental exposure of all the samples during a protocol/process run. Such measurements are useful in high throughput screening runs where multiple microplates may be run through an automated process for several hours or several days, during which the environmental conditions may vary significantly.

Thus, the present invention describes a method and apparatus for measuring local environmental variables using a sensor system that can be attached to a surface of a container that holds a material of interest. In doing so, a user can determine with great certainty, visibility, and granularity what conditions the material experienced before, during, and after a process was executed.

As noted above and in the related co-filed US provisional patent applications, the environmental data is preferably transferred to a file system that can be used to determine correlations between the environmental data and instrument measurements and/or results achieved by the process. For example as described in co-filed US Provisional patent applications entitled (1) "Method and Apparatus for Process Optimization" which was filed on Oct. 1, 2018 and received U.S. Provisional Application Ser. No. 62/739,441; (2) "Method and Apparatus for Process Optimization" which was filed on Feb. 4, 2019 and received U.S. Provisional Application Ser. No. 62/800,900, and (3) "Systems and methods to integrate environmental information into measurement metadata in an Electronic Laboratory Notebook Environment" which received U.S. Provisional Application Ser. No. 62/739,427, armed with local environmental data about a material as it progresses through a protocol/process run, a user can choose to discontinue the process run, modify the process to account for environmental variations, or discard the material prior to a process run. Ultimately the goal is to improve the quality of the outcome of the process and save time, costs, and effort. Gathering local environmental data/factors/conditions using the methods and systems described herein provides great utility in all of these endeavors.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Numerical values in the specification and claims of this application reflect average values for a composition. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

The invention claimed is:

1. A sensor system comprising:
a microprocessor and a memory;
an antenna;
a flexible planar battery;
a sensor configured to measure an environmental parameter selected from the group consisting of: temperature, absolute humidity, relative humidity, light intensity, and light wavelength, wherein the environmental parameter is stored in the memory; and
means for transmitting the environmental parameter measured by the sensor and stored in the memory wirelessly via the antenna;
wherein:
the system is embodied in a thin flexible planar form;
the microprocessor and the memory; the means of transmitting information wirelessly, the antenna, the flexible planar battery, and the sensor are electrically and/or communicatively coupled and mounted on a flexible circuit; and the system further comprises an adhesive or magnetic portion to allow for attachment of the system to a micro-well plate containing a material that is subject to high-throughput screening.

2. The system of claim 1, wherein the means for transmitting the environmental parameter wirelessly is selected from the group consisting of: a wireless radio; an Near Field Communication (NFC) chip; an Radio Frequency Identification (RFID) chip; a WiFi chip; and a Cellular chip, and
wherein the antenna is selected from the group consisting of: a Bluetooth antenna; an NFC antenna; an RFID antenna; a wifi antenna; and a cellular antenna.

3. The system of claim 1, wherein the sensor system is configured to wirelessly transmit the environmental parameter stored in the memory: at regular intervals.

4. The system of claim 3,
wherein the sensor system is configured to transmit data at a regular time interval selected from the group consisting of: once a minute, once an hour, and once a day, or
wherein the sensor system is configured to transmit data when interrogated by sending a signal to the sensor system requesting data to be transmitted, and/or by bringing an RFID or NFC reader in proximity of the RFID or NFC antenna.

5. The system of claim 1, wherein the environmental parameter stored in memory is transmitted to a smart phone, a gateway device, a wifi router, a sensor control unit, or a cellular receiver, and
wherein the environmental parameter is subsequently transmitted by the smart phone, the gateway device, the wifi router, the sensor control unit, or the cellular receiver to a cloud server.

6. The system of claim 1, wherein the environmental parameter is associated and stored in memory with a timestamp containing the time of measurement by the sensor and a unique identifier which identifies the sensor system apparatus.

7. The system of claim 1, further comprising a second sensor configured to measure a second environmental parameters selected from the group consisting of:
Temperature
Absolute humidity and relative humidity
light intensity and wavelengths
electromagnetic wave intensity
electromagnetic wave frequency
RF interference
motion including vibration and rotation
gas concentration (such as oxygen, CO2, etc.)
air pressure
flow rate
VOC concentration (volatile organic compounds)
particulate level
measure of air quality including particulate count and VOC (volatile organic compound) concentration
concentrations of different gases, such as oxygen, CO2, CO, N2, and other gases
pH
magnetic and electric fields, and
Capacitance
wherein the second environmental parameter is different from the first environmental parameter and is stored in the memory, and wherein the system further comprises means for transmitting the second environmental parameter measured by the second sensor wirelessly via the antenna.

8. The system of claim 1, wherein the sensor system is configured to wirelessly transmit the environmental parameter stored in the memory when interrogated.

9. The system of claim 1, wherein:
the sensor system is configured to transmit data at a regular time interval selected from the group consisting of: once a minute, once an hour, and once a day; or
the sensor system is configured to transmit data when interrogated by sending a signal to the sensor system requesting data to be transmitted, and/or by bringing an RFID or NFC reader in proximity of the RFID or NFC antenna.

10. A combination comprising a micro-well plate containing a material subject to high-throughput screening and a sensor system, the sensor system comprising:
a microprocessor and a memory;
an antenna;
a flexible planar battery;
a sensor configured to measure an environmental parameter selected from the group consisting of: temperature, absolute humidity, relative humidity, light intensity, and light wavelength, wherein the environmental parameter is stored in the memory; and
means for transmitting the environmental parameter measured by the sensor and stored in the memory wirelessly via the antenna;
wherein:
the sensor system is embodied in a thin flexible planar form,
the microprocessor and the memory, the means of transmitting information wirelessly,
the antenna, the flexible planar battery, and the sensor are electrically and/or communicatively coupled and mounted on a flexible circuit,
the sensor system is associated with and conforms to a surface of the micro-well plate.

11. A method for determining local environmental data of a material disposed on a micro-well plate comprising the steps of:
(a) associating a sensing system with the micro-well plate containing the material, wherein the sensor system takes the shape of the surface of the micro-well plate, and
(b) using the sensor system to measure the local environmental data,
(c) subjecting the combination to a high-throughput screening protocol; and
(d) determining by the sensor system the environmental parameter before, during, and after step (c);
wherein the sensor system comprises:
a microprocessor and a memory;
an antenna;
a flexible planar battery:
a sensor configured to measure an environmental parameter selected from the group consisting of: temperature, absolute humidity, relative humidity, light intensity, and light wavelength, wherein the environmental parameter is stored in the memory; and
means for transmitting the environmental parameter measured by the sensor and stored in the memory wirelessly via the antenna;
wherein:
the system is embodied in a thin flexible planar form; and
the microprocessor and the memory; the means of transmitting information wirelessly, the antenna, the flexible planar battery, and the sensor are electrically and/or communicatively coupled and mounted on a flexible circuit.

12. The method of claim 11, further comprising the steps of:
  (e) wirelessly transmitting the environmental parameter measured in step (b) to a smart phone, a gateway device, wifi router, sensor control unit and/or cellular receiver; and
  (f) wirelessly transmitting the environmental parameter by the smart phone, the gateway device, the wifi router, the sensor control unit or the cellular receiver to and stored on a cloud server.

13. The method of claim 11, wherein the environmental parameter is associated and stored in the memory with a timestamp comprising the time of measurement by the sensor and a unique identifier which identifies the sensor system apparatus.

14. The method of claim 11, wherein the environmental parameter is measured before, during, and after the container containing the material progresses through an experimental protocol, clinical protocol, or manufacturing process.

15. The method of claim 11, wherein the container is a micro-well plate that is subject to high-throughput screening, and the method further comprises the steps of:
  (e) subjecting the combination to a high-throughput screening protocol; and
  (f) determining by the sensor the environmental parameter before, during, and after step (e).

* * * * *